United States Patent
Chou et al.

(10) Patent No.: US 11,308,403 B1
(45) Date of Patent: Apr. 19, 2022

(54) AUTOMATIC IDENTIFICATION OF CRITICAL NETWORK ASSETS OF A PRIVATE COMPUTER NETWORK

(71) Applicant: Trend Micro Incorporated, Tokyo (JP)

(72) Inventors: Ping-I Chou, Taipei (TW); Yen-Shuo Huang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1322 days.

(21) Appl. No.: 15/586,602

(22) Filed: May 4, 2017

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | | | |
|---|---|---|---|---|
| 6,769,066 B1 * | 7/2004 | Botros | ................... | G06F 21/55 700/110 |
| 9,009,825 B1 * | 4/2015 | Chang | ................. | H04L 63/1425 726/22 |
| 9,774,613 B2 * | 9/2017 | Thomas | ................... | H04L 63/20 |
| 2016/0173525 A1 * | 6/2016 | Thomas | ................... | H04L 63/20 726/23 |
| 2017/0078322 A1 * | 3/2017 | Seiver | ................. | H04L 43/0876 |
| 2017/0104790 A1 * | 4/2017 | Meyers | ............... | H04L 63/1433 |
| 2018/0027006 A1 * | 1/2018 | Zimmermann | ..... | H04L 63/0227 726/11 |
| 2018/0219889 A1 * | 8/2018 | Oliner | ...................... | G06N 3/08 |

OTHER PUBLICATIONS

Maloof, Marcus A., ed. Machine learning and data mining for computer security: methods and applications. Springer Science & Business Media, 2006, pp. 1-177. (Year: 2006).*

* cited by examiner

*Primary Examiner* — Kamran Afshar
*Assistant Examiner* — Randall K. Baldwin
(74) *Attorney, Agent, or Firm* — Patrick D. Benedicto

(57) ABSTRACT

Critical network assets of a private computer are automatically identified by training a machine learning model with histograms of features obtained by aggregating data of log entries. The model is deployed in a private computer network and retrained using training data set of the private computer network. Data from log entries of a target network asset are aggregated, numerically transformed, and converted into features histograms. The features histograms are concatenated into a single file, which is provided to the machine learning model for prediction. The machine learning model outputs a prediction score that gives an indication of whether or not the target network asset is critical.

18 Claims, 7 Drawing Sheets

AUTOMATIC IDENTIFICATION OF CRITICAL NETWORK ASSETS OF A PRIVATE COMPUTER NETWORK

BACKGROUND OF THE INVENTION

1. Field of the Invention

The present invention relates generally to computer technology, and more particularly but not exclusively to methods and systems for identifying critical network assets of private computer networks.

DESCRIPTION OF THE BACKGROUND ART

Organizations, such as corporations and other entities with a plurality of users, may maintain a private computer network that comprises a plurality of network devices, such as servers, end user computers, routers, etc. The private computer network may restrict access to services by providing and maintaining computer accounts ("accounts"). A user may log into his account to use a service provided by a server (e.g., email server, file server). Accounts and network devices are examples of network assets ("assets") of the private computer network. However, not all assets have equal importance to an organization. More particularly, some assets, which are referred to herein as "critical assets," are more important than others. As an example, a file server provides storage space for a plurality of users. Accordingly, file servers, and servers in general, are more critical to the functionality of the private computer network compared to computers that are used by a single user or sparingly used by a few users. As another example, an administrator account, which has administrator privileges, is more critical to the functionality of the private computer network compared to a normal user account.

Embodiments of the present invention are directed to automatic identification of critical assets of a private computer network so that these assets may be provided more or enhanced security, thereby improving the overall functionality and operation of the private computer network.

SUMMARY

In one embodiment, critical network assets of a private computer are automatically identified by training a machine learning model with histograms of features obtained by aggregating data of log entries. The model is deployed in a private computer network and retrained using a training data set of the private computer network. Data from log entries of a target network asset are aggregated, numerically transformed, and converted into features histograms. The features histograms are concatenated into a single file, which is provided to the machine learning model for prediction. The machine learning model outputs a prediction score that gives an indication of whether or not the target network asset is critical.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
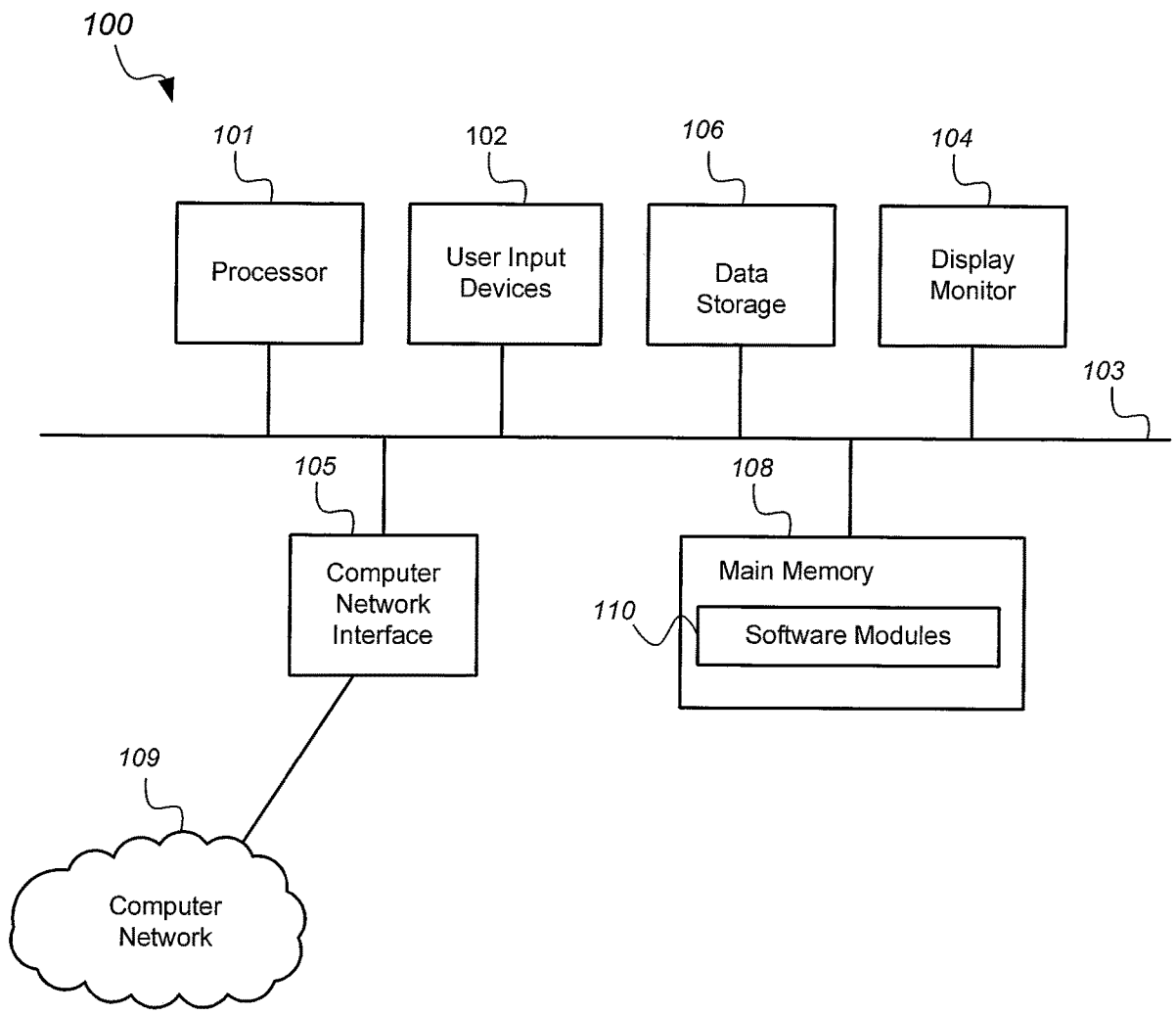
FIG. 1 shows a schematic diagram of a computer system that may be employed in embodiments of the present invention.

Referring now to FIG. 1, there is shown a schematic diagram of a computer system 100 that may be employed in embodiments of the present invention. The computer system 100 may be employed as a server computer, an end user computer, or other computers disclosed below. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules.

Figure 2:
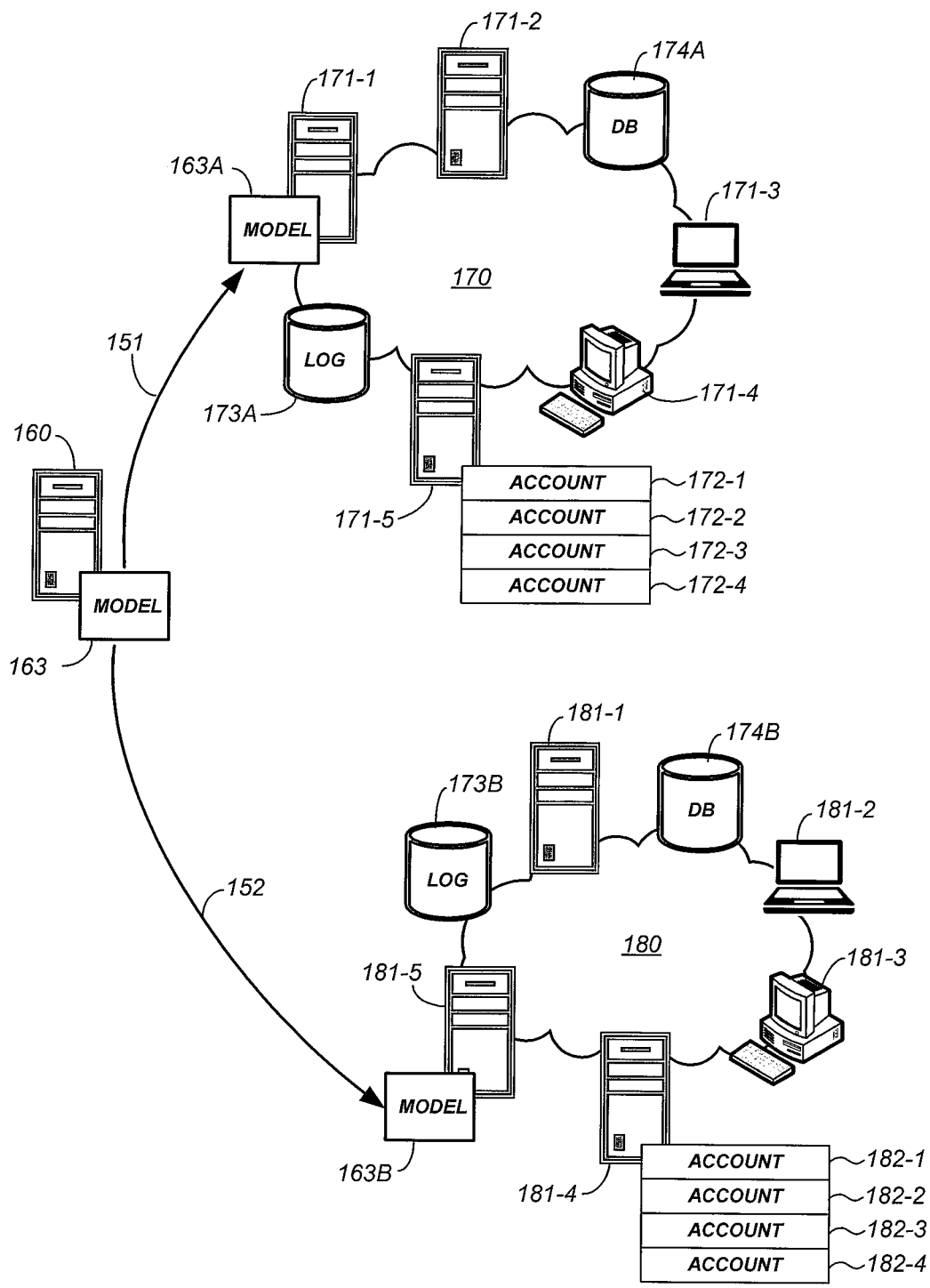
FIG. 2 shows a block diagram of a system for automatically identifying critical network assets of a private computer network in accordance with an embodiment of the present invention.

FIG. 2 shows a block diagram of a system for automatically identifying critical network assets of a private computer network in accordance with an embodiment of the present invention. FIG. 2 depicts a private computer network 170 and a private computer network 180 for illustration purposes. In general, the system of FIG. 2 may include one or more private computer networks. The network devices of FIG. 2 communicate internally over their respective private computer networks, and externally over the Internet.

In the example of FIG. 2, the private computer network 170 includes a plurality of computers 171 (i.e., 171-1, 171-2, 171-3, etc.) and maintains accounts 172 (i.e., 172-1, 172-2, 172-3, etc.). Similarly, the private computer network 180 includes a plurality of computers 181 (i.e., 181-1, 181-2, 181-3, etc.) and maintains accounts 182 (i.e., 182-1, 182-2, 182-3, etc.). In general, the description of the private computer network 170 equally applies to the private computer network 180. Accordingly, the following description refers to the private computer network 170 for illustration purposes.

In the private computer network 170, a computer 171 may or may not be critical to the operation of the private computer network 170. For example, the computer 171-3 may simply be desktop computer employed by a single user or a few users. In that case, the computer 171-3 is not critical to the operation of the private computer network 170. A security issue on the computer 171-3 may be limited to the computer 171-3 and its few users, and do not necessarily affect the entire private computer network 170. On the other hand, the computer 171-2 may be a server (i.e., a server computer with server software) that provides services to the computers 171 and their users in general. In that case, the computer 171-2 may be critical to the operation of the private computer network 170. In one embodiment, a server is deemed a critical asset; all other network devices are deemed to be normal (i.e., non-critical) assets. Generally speaking, a server comprises a computer that hosts suitable server software for providing a service on the private computer network.

Services provided by servers of the private computer network 170 may have associated accounts 172. Not all accounts 172 are critical to the operation of the private computer network 170. The account 172-1 may be a single-user email account on an email server of the private computer network 170. The account 172-1 is not critical to the operation of the private computer network 170, as a security breach involving the account 172 will affect its user but not necessarily the private computer network 172 in general. The account 172-2 may be an administrator account for assigning email accounts, authorizing accesses to services, etc., and is thus critical to the operation of the private computer network 170. In one embodiment, an administrator account is deemed to be a critical asset, and all other accounts are deemed to be normal assets.

The private computer network 170 may maintain a log 173A (labeled as 173B in private computer network 180). The log 173A may comprise a Microsoft Windows™ security event log, Microsoft Windows™ application log, web proxy log, Secure Shell (SHH) log, etc. In general, the log 173A includes log entries, which are records of activities or events involving network devices and accounts. In one embodiment, the log 173A indicates each instance of computer and/or account access.

In the example of FIG. 2, the private computer network 170 includes a server 171-1 that hosts a machine learning model 163A (labeled as 163B in private computer network 180). The machine learning model 163A may comprise a logistic regression model (or other machine learning model) for identifying a critical asset based on log entries recorded in the log 173A. In one embodiment, the server 171-1 is configured to receive individual log entries from the log 173A, identify model features ("features") from the log entries, aggregate the identified features of a network asset (e.g., network device or account, which may or may not be critical) to generate histograms of features for the asset, and input the histograms to the machine learning model 163A to obtain a prediction of whether or not the asset is a critical asset. The prediction generated by the machine learning model 163A may include a numerical prediction score that is indicative of whether or not the asset is a critical asset. The prediction score and the features histograms of the asset may be stored in a database 174A (labeled as 174B in the private computer network 180) for later consultation. The database 174A may be consulted to determine if an asset is a critical asset. In particular, an asset that has been identified as critical may be provided more security. For example, a critical asset may be monitored more frequently, be given higher priority to obtain security software updates, be restricted to certain users, or provided security that is not provided to non-critical assets, etc.

In one embodiment, the model 163A is a particular embodiment of a machine learning model 163 that is trained on an external support server 160. In one embodiment, the support server 160 comprises a computer that is configured to train the model 163 using labeled training data sets. More particularly, the support server 160 may include a training data set comprising histograms of features of known critical assets and histograms of features of known normal assets. The histograms of features of the known critical assets are labeled as critical for training purposes, and the histograms of features of the known normal assets are labeled as normal for training purposes. The machine learning model 163 is trained using the training data set to allow the learning model 163 to distinguish critical assets from non-critical (also referred to herein as "normal") assets. Once trained, the machine learning model 163 may be deployed in a subscribing private computer network (see arrows 151 and 152), such as the private computer network 170. The support server 160 may provide the model 163 to subscribing private computer networks over the Internet. For improved prediction accuracy, the model 163 may be retrained with training data set of the particular private computer network. In the example of FIG. 2, the model 163 is labeled as 163A as deployed in the private computer network 170 to indicate that the model 163 has been retrained using data sets of the private computer network 170.

Figure 3:
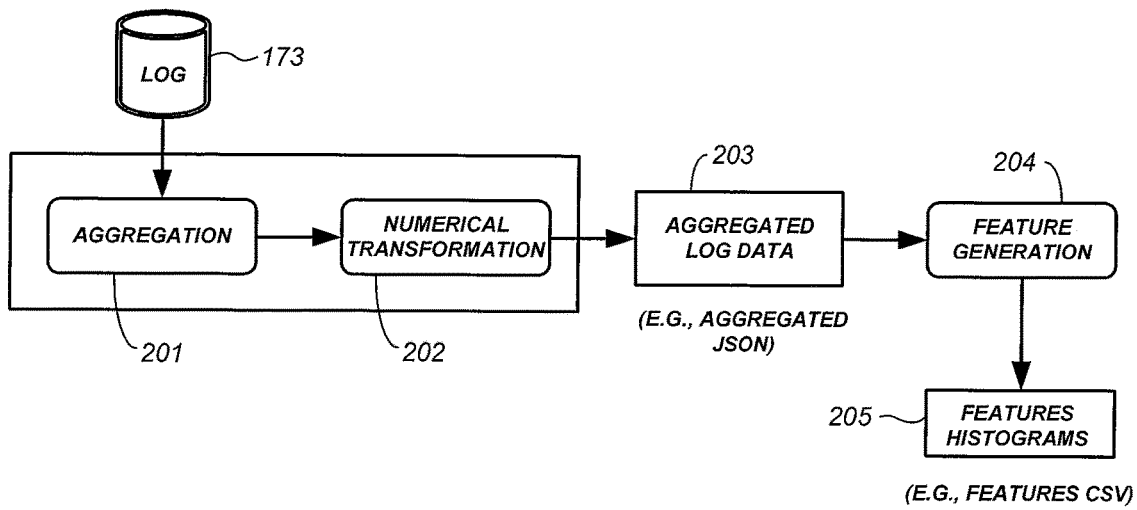
FIG. 3 shows a flow diagram of a method of generating features histograms in accordance with an embodiment of the present invention.

FIG. 3 shows a flow diagram of a method of generating features histograms in accordance with an embodiment of the present invention. In the example of FIG. 3, the features histograms comprise histograms of features of a single asset, which, for example, may be a single network device or a single account. The features histograms of the asset may be concatenated into a single file. The features are also referred to herein as "model features" because they are machine learning features for training the machine learning model. Generally speaking, a histogram separates amounts of data into bins according to some conditions. A feature histogram may bin values of a feature according to time or some other condition. As a particular example, a feature may be a login to a particular asset, such as a server or account. In that example, the feature histogram of the asset for login count shows the number of logins to the asset over a period of time. For example, assuming the following login entries to an ASSET1:

TIMESTAMP ENTRY
00:11 Login to ASSET1 from NetworkDevice2
00:30 Login to ASSET1 from NetworkDevice3
05:33 Login to ASSET1 from NetworkDevice2
08:05 Login to ASSET1 from NetworkDevice5

The feature of login to the asset may be aggregated into a histogram by binning per hour over a 24-hour period. In that example, the histogram for the aggregated feature of login to the asset may have 24 bins (one for each hour), such as in the format [HOUR:COUNT] as follows,

[0:2], [1:0], [2:0], [3:0], [4:0], [5:1], [6:0], [7:0], [8:1], [9:0], etc.

where there are two logins to the ASSET1 in the first hour (i.e., from 00:00 to 00:59 hour), zero login to the ASSET1 in the second hour (i.e., from 01:00 to 01:59 hour), etc. Advantageously, instead of relying on a single login to predict whether or not an asset is critical, the prediction is based on historical data, i.e., logins made over a period of time.

The method of FIG. 3 may be performed by the support server 160 to generate features histograms for training the model 163 to identify critical assets, or by the private computer network 170 (or 180) to generate features histograms of a network device/account for input to the model 173A (or 173B in private computer network 180) to predict whether or not the network device/account is a critical asset.

The above example log entries indicate a timestamp, the asset being accessed (e.g., ASSET1), and the asset doing the access (e.g., NetworkDevice1). Generally speaking, a single log entry may include fields that indicate a timestamp of when the log entry was made, the account name of the account that is accessing a network device, the hostname of the network device, an event ID of the event (e.g., access), etc. As can be appreciated, a log entry may include fewer or more information.

In the example of FIG. 3, log data from a plurality of log entries of the log 173 are aggregated (FIG. 3, 201) and then numerically transformed (FIG. 3, 202) to generate aggregated log data (FIG. 3, 203), which are formatted (FIG. 3, 204) into features histograms (FIG. 3, 205) suitable for input to a machine learning model for training or prediction. The aggregated log data may comprise features, such as counts of access to an account or a network device over a period of time (e.g., hourly, weekly, etc.). The aggregated log data may be numerically transformed to make the corresponding features more stable. The numerical transformation may involve taking the logarithm or entropy of the aggregated log data. For example, a logarithmic function may be applied to a total access count to generate a log transform of the total access count. In one embodiment, features histograms generated from aggregated log data include:

Total access count: the count of access log.
Log transform of total access count.
Hourly histogram: the access count distribution in each hour.
Weekly histogram: the access count distribution in each weekday.
Account histogram: the count distribution for each account
Entropy transform: entropy of the access count
Count of non-zero histogram: Since hourly/weekly histogram may be sparse, only some intervals contains non-zero values. This feature is the count of non-zero values.
Event ID distribution The examples presented herein focus on features involving access counts, i.e., logins. In general, features may be selected depending on the critical asset being detected and the particulars of the private computer network.

In one embodiment, the aggregated log data are in JavaScript Object Notation (JSON) format. The aggregated log data (e.g., total access count, entropy of hourly histogram of total access count, non-zero count of hourly histogram, etc.) may be used as features histograms by converting the aggregated log data into another data format more suitable for being input to a machine learning model. TABLE 1 below shows an example where aggregated log data in JSON format is converted to Comma Separated Values (CSV) format to generate the corresponding features histogram. The features histograms of TABLE 1, which may be for a single account or network device, may comprise a plurality of histograms that are concatenated as a single CSV file.

TABLE 1 host, SumHist, SHLog, entropy, HistLen, MaxEntHist, MinEntHist, EventLen, AcctLen, EntropyAcct, WeekLen, WeekSum, WeekEntropy, Hist, HistP, HistEntropy, EventP, EventCnt, WeekCnt, WeekP
tw-
henryyang,2033,7.61726,3.1508,24,2.5952,2.22621,1,3,0.1766,7,2033,
1.9363,73,76,96,117,87,83,94,88,100,170,78,76,85,87,68,81,84,78,71,
71,65,68,69,68,0.0359,0.0374,0.0472,0.0576,0.0428,0.0408,0.0462,
0.0433,0.0492,0.0836,0.0384,0.0374,0.0418,0.0428,0.0334,0.0398,
0.0413,0.0384,0.0349,0.0349,0.0320,0.0334,0.0339,0.0334,2.5161,
2.5047,2.5953,2.4713,2.5770,2.4640,2.4826,2.5726,2.5773,2.2262,
2.4889,2.5266,2.5201,2.5462,2.5279,2.5112,2.5053,2.4944,2.4608,
2.4384,2.4554,2.4660,2.4424,2.4380,0.0000,0.0000,0.0000,0.0000,
1.0000,0,0,0,0,2033,257,344,273,364,265,270,260,0.1264,0.1692,
0.1343,0.1790,0.1303,0.1328,0.1279

The features histograms of the example of TABLE 1 has the following fields:

SumHist: total access count
SHLog: the log transform of total access count
Entropy: the entropy of hourly histogram
HistLen: Non-zero count in hourly histogram
MaxEntHist/MinEntHist: the max/min entropy of each hour
EventLen: Number of distinct event types
AcctLen: Number of distinct accounts
EntropyAcct: the entropy of account distribution
Hist: the hourly histogram with counts. (24 fields)
HistP: the hourly histogram with probabilities (24 fields)
HistEntropy: the entropy of each hour
EventP: the event distribution with probabilities. (5 fields)
EventCnt: the event distribution with counts. (5 fields)
WeekCnt: the weekly histogram with counts. (7 fields)
WeekP: the weekly histogram with probabilities. (7 fields)

Figure 4:
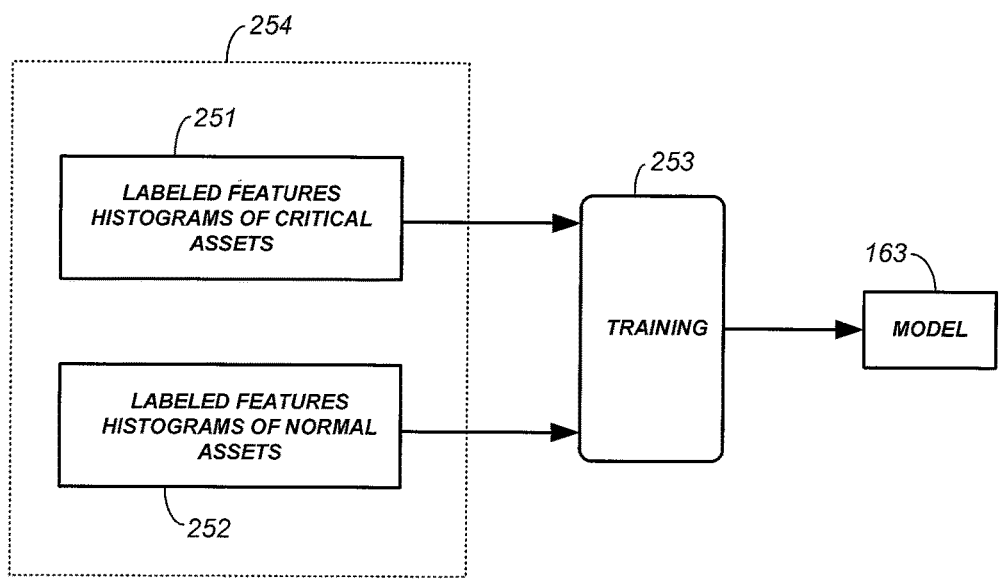
FIG. 4 shows a flow diagram of a method of generating a machine learning model for automatically identifying critical network assets in accordance with an embodiment of the present invention.

FIG. 4 shows a flow diagram of a method of generating the machine learning model 163 in accordance with an embodiment of the present invention. In the example of FIG. 4, a training data set 254 for training the model 163 comprises features histograms of known critical assets (FIG. 4, 251) and features histograms of known normal assets (FIG. 4, 252). The features histograms of the training data set 254 are labeled to train (FIG. 4, 253) the machine learning model 163 to learn the characteristics of features histograms of critical assets and features histograms of normal assets. In one embodiment, the machine learning model 163 is a logistic regression model. Other machine learning models may be also employed without detracting from the merits of the present invention.

Figure 5:
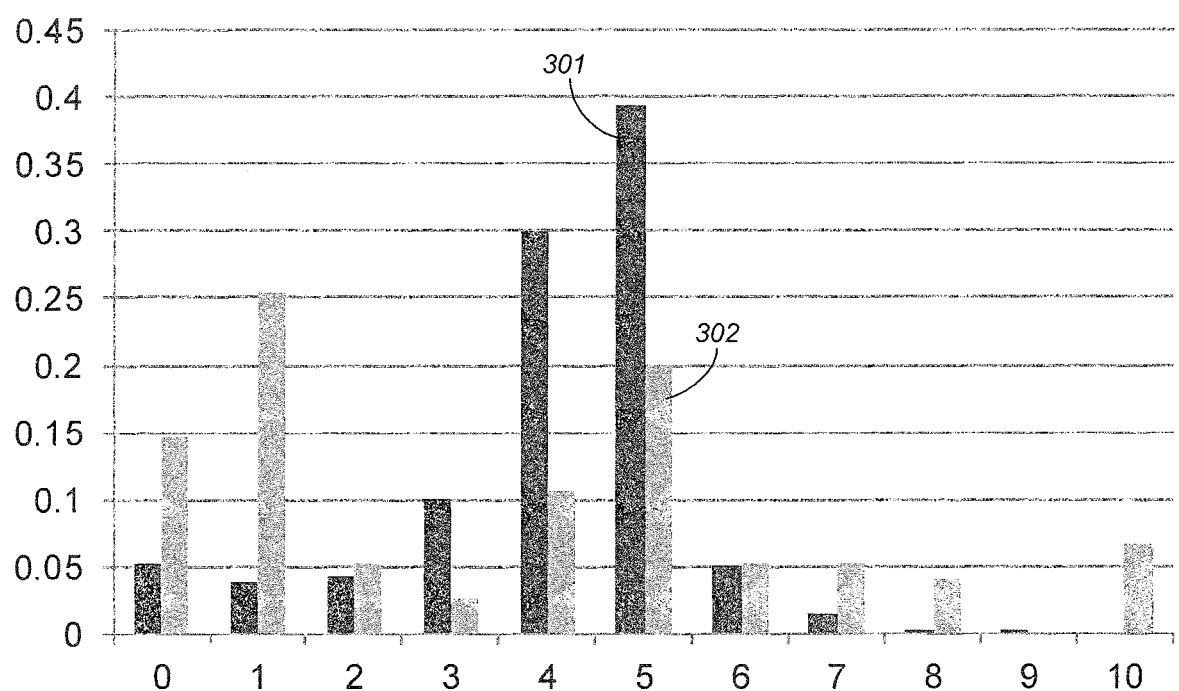
FIGS. 5-7 show example distribution rates of features of a training data set for training a machine learning model, in accordance with an embodiment of the present invention.
Figure 6:
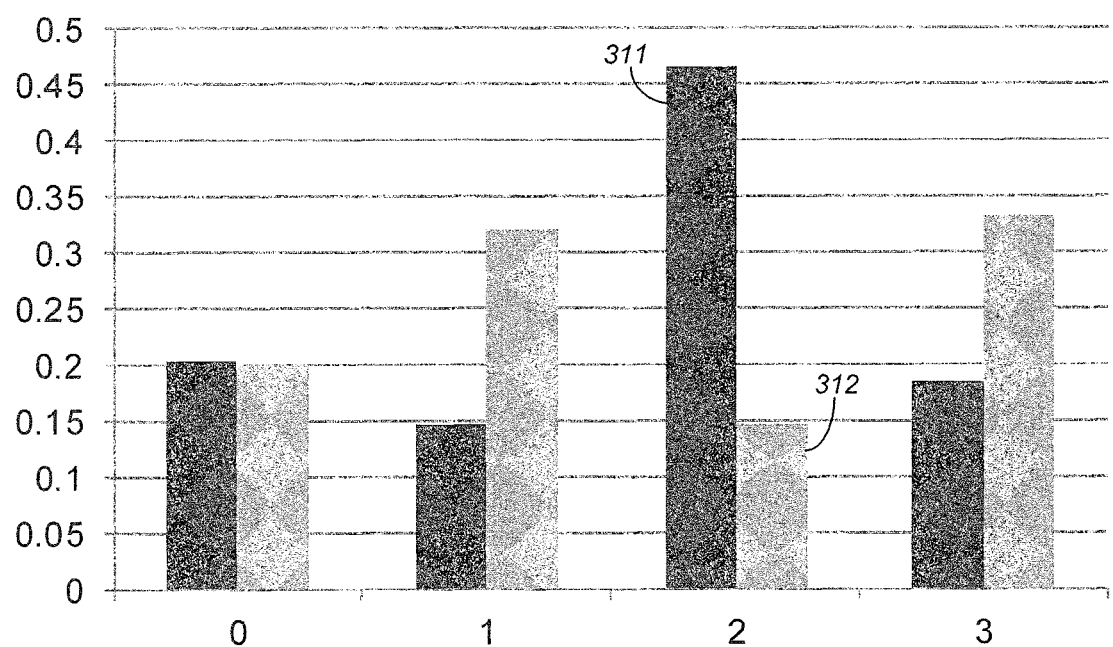
Figure 7:
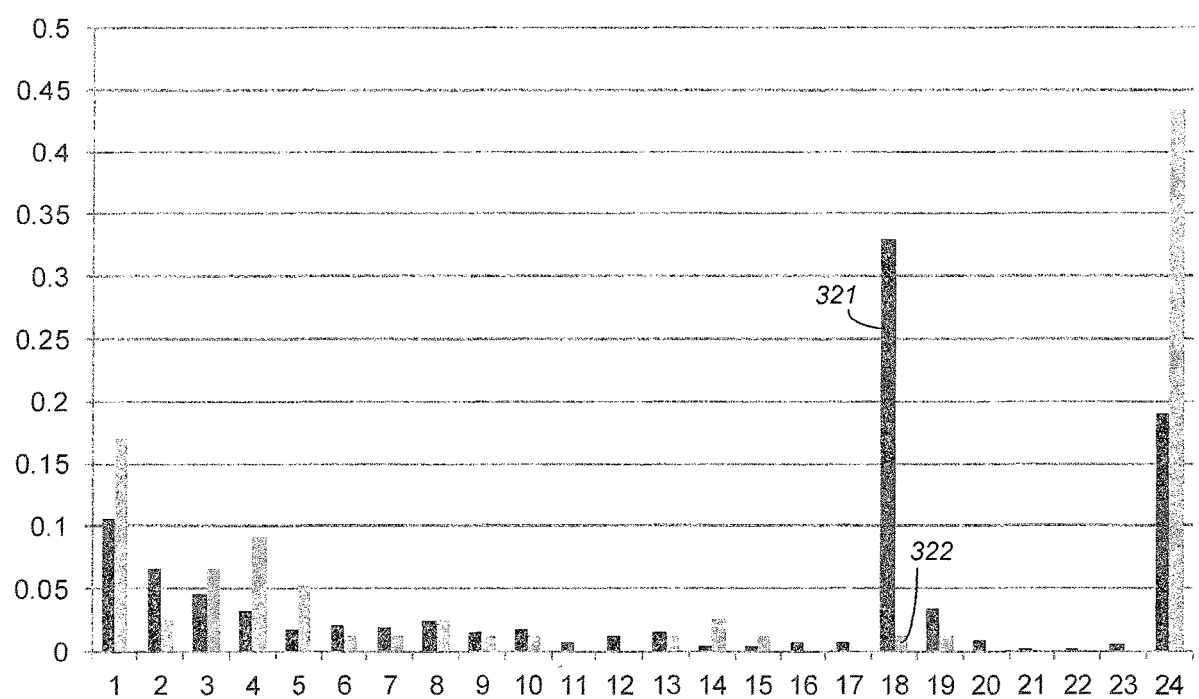

FIGS. 5-7 show example distribution rates of some of the features of the training data set 254 that may be included to train the machine learning model 163, in accordance with an embodiment of the present invention. The example of FIGS. 5-7 are for training the machine learning model 163 to distinguish servers from normal computers. In the example of FIGS. 5-7, the dark bars (i.e., FIG. 5, 301; FIG. 6, 311; FIG. 7, 321) represent servers, and the lighter bars (i.e., FIG. 5, 302; FIG. 6, 312; FIG. 7, 322) represent normal computers. The X-axis indicates value and the Y-axis indicates distribution rate. FIG. 5 shows a log transform of total access count, FIG. 6 shows an entropy of the histogram of total access count, and FIG. 7 shows the non-zero count in hourly histogram.

As can be seen from FIGS. 5-7, the historical access patterns for servers and normal computers are different, and may thus be employed to train the model 163 to distinguish servers from normal computers. Referring to FIG. 6 as an example, the first column 0 in the x-axis indicates the entropy between 0-1 and the second column 1 indicates an entropy between 1-2. The third column shows that more than 45% of normal computers have entropy between 2-3, but only 15% of servers have entropy between 2-3. This indicates that entropy is a better predictor of whether or not a computer is a server, and may thus be given a higher weight by the machine learning model 163.

Figure 8:
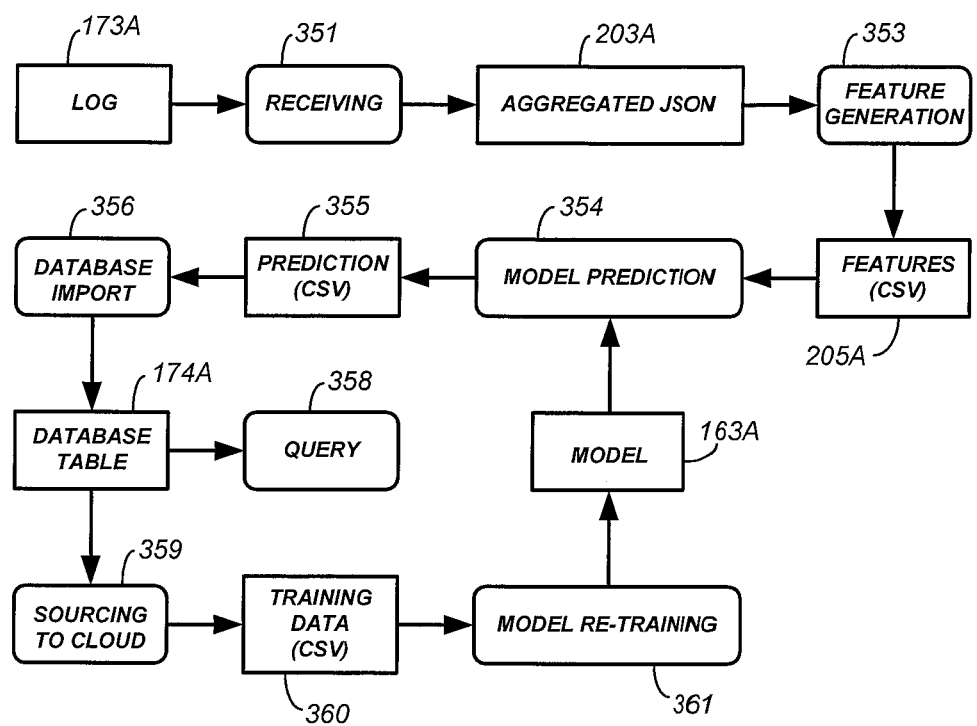
FIG. 8 shows a flow diagram of a method of automatically identifying critical network assets of a private computer network in accordance with an embodiment of the present invention.

FIG. 8 shows a flow diagram of a method of automatically identifying critical network assets of a private computer network in accordance with an embodiment of the present invention. The method of FIG. 8 may be performed by a server that hosts a model 163 in a private computer network. For example, the method of FIG. 8 may be performed by the server 171-1 that hosts the model 163A in the private computer network 170 (see FIG. 2).

In the example of FIG. 8, the log entries of the log 173A are received (FIG. 8, 351) by the server 171-1. The log entries may be received by streaming or in batches. In one embodiment, the server 171-1 is configured to aggregate the log data of the log entries into JSON format for a target asset (FIG. 8, 203A), and generates the features histograms (FIG. 8, 353) of the target asset by converting the aggregated log data in JSON format to features histograms in CSV format (FIG. 8, 205A). The procedure for processing the log entries of the target asset into features histograms may be the same as that described with reference to FIG. 3. For example, the features histograms of the target asset may have the same format as the features histograms of TABLE 1.

To determine whether or not the target asset is a critical asset, a single file that contains the features histograms of the target asset is input to the model 163A, which in one embodiment returns a prediction (FIG. 8, 354) in CSV format (FIG. 8, 355). In one embodiment, the prediction includes a prediction score indicative of whether or not the target asset is a critical asset and also the features values from the input features histograms. In one embodiment, the prediction score may be from 0.0 to 1.0, with 1.0 indicating that there is a 100% chance that the target asset is critical and 0.0 indicating that the target asset has 0% chance of being critical. The prediction score may be compared to a threshold, and the target asset may be deemed to be critical when its prediction score is greater than the threshold.

The server 171-1 imports (FIG. 8, 356) the prediction into the database 174A. In one embodiment, the database 174A stores the predictions and features of assets that have been evaluated in the private computer network 170. The database 174A may be consulted (FIG. 8, 358) to respond to queries (e.g., web or local queries) regarding particular assets. Data in the database 174A may be labeled using feedback information from the private computer network 170 for retraining the model 163A. In the example of FIG. 8, the model 163A may be retrained (FIG. 8, 361) using a new training data set from predictions stored in the database 174A and new data from the support server 160 (FIG. 8, 359). The new training data set may be labeled and stored in CSV format (FIG. 8, 360) and used to retrain the model 163A. The model 163A may also be retrained in the support server 160.

Methods and systems for identifying critical assets of a private computer network have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
receiving a plurality of log entries from a log of a private computer network;
extracting, from the log entries, particular log entries that indicate logins to a target computer of the private computer network;
aggregating the particular log entries to generate a histogram of logins to the target computer;
inputting the histogram to a machine learning model to determine whether or not the target computer is a type of computer that provides a service to other computers of the private computer network;
receiving a prediction from the machine learning model indicating that the target computer is the type of computer that provides the service to the other computers of the private computer network;
and
in response to the prediction, providing security to the target computer.

2. The computer-implemented method of claim 1, further comprising:
receiving the machine learning model from a support server computer that is outside the private computer network.

3. The computer-implemented method of claim 2, further comprising:
after receiving the machine learning model in the private computer network, retraining the machine learning model in the private computer network.

4. The computer-implemented method of claim 1, further comprising:
numerically transforming the histogram before the histogram is input to the machine learning model.

5. The computer-implemented method of claim 4, wherein numerically transforming the histogram includes applying a logarithmic function to the histogram.

6. The computer-implemented method of claim 1, further comprising:
before inputting the histogram to the machine learning model, transcoding the histogram into a comma separated value format.

7. A computer-implemented method comprising:
receiving a plurality of log entries from a log of a private computer network;
extracting, from the log entries, particular log entries that indicate access to a target account of a service provided on the private computer network;
aggregating the particular log entries to generate a histogram of accesses to the target account;
inputting the histogram to a machine learning model to determine whether or not the target account is an administrator account of the service; and
determining that the target account is the administrator account of the service based on a prediction from the machine learning model.

8. The computer-implemented method of claim 7, further comprising:

receiving the machine learning model from a support server computer that is outside the private computer network.

9. The computer-implemented method of claim 8, further comprising:
after receiving the machine learning model in the private computer network, retraining the machine learning model in the private computer network.

10. The computer-implemented method of claim 7, further comprising:
numerically transforming the histogram before the histogram is input to the machine learning model.

11. The computer-implemented method of claim 10, wherein numerically transforming the histogram includes applying a logarithmic function to the histogram.

12. The computer-implemented method of claim 7, further comprising:
before inputting the histogram to the machine learning model, transcoding the histogram into a comma separated value format.

13. A computer system comprising a memory and a processor, the memory including instructions that when executed by the processor causes the computer system to:
receive a plurality of log entries from a log of a private computer network;
extract, from the log entries, particular log entries that indicate access to a target asset of the private computer network;
aggregate the particular log entries to generate a histogram of accesses to the target asset;
input the histogram to a machine learning model; and
receive a prediction from the machine learning model, the prediction indicating a likelihood that the target asset is a critical asset that is more important than other assets of a same type as the target asset.

14. The computer system of claim 13, wherein the instructions, when executed by the processor, further cause the computer system to:
determine that the target asset is the critical asset in response to the likelihood being greater than a threshold.

15. The computer system of claim 14, wherein the target asset is a type of computer that provides a service to other computers of the private computer network.

16. The computer system of claim 14, wherein the target asset is an administrator account of a service provided on the private computer network.

17. The computer system of claim 13, wherein the prediction indicates the likelihood of the target asset being a server computer that provides a service to other computers of the private computer network as opposed to a normal user computer that is employed by a single user.

18. The computer system of claim 13, wherein the prediction indicates the likelihood of the target asset being an administrator account as opposed to a normal user account.

\* \* \* \* \*